US012722480B2

(12) United States Patent
Brilka et al.

(10) Patent No.: US 12,722,480 B2
(45) Date of Patent: Sep. 1, 2026

(54) DRIVE DEVICE FOR A MOTOR VEHICLE DRIVE TRAIN OF AN ELECTRIC VEHICLE

(71) Applicant: ZF Friedrichshafen AG, Friedrichshafen (DE)

(72) Inventors: Tobias Brilka, Iggensbach (DE); Franz Reitinger, Esternberg (AT); Alexander Mühlbauer, Windorf (DE); Andreas Pfeffer, Viechtach (DE); Tobias Wittrock, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 24 days.

(21) Appl. No.: 18/562,041

(22) PCT Filed: May 10, 2022

(86) PCT No.: PCT/EP2022/062576
§ 371 (c)(1),
(2) Date: Nov. 17, 2023

(87) PCT Pub. No.: WO2022/243104
PCT Pub. Date: Nov. 24, 2022

(65) Prior Publication Data
US 2024/0227551 A1 Jul. 11, 2024

(30) Foreign Application Priority Data
May 20, 2021 (DE) ..................... 10 2021 205 128.6

(51) Int. Cl.
*B60K 17/346* (2006.01)
*B60K 1/00* (2006.01)
(Continued)

(52) U.S. Cl.
CPC ............ *B60K 17/3467* (2013.01); *B60K 1/00* (2013.01); *B60K 17/346* (2013.01); *B60K 17/348* (2013.01); *B60K 23/08* (2013.01)

(58) Field of Classification Search
CPC .... B60K 17/3467; B60K 1/00; B60K 17/346; B60K 17/348; B60K 23/08; B60K 17/06; B60K 17/3462
See application file for complete search history.

(56) References Cited

U.S. PATENT DOCUMENTS 4,541,503 A * 9/1985 Akutagawa .......... B60K 17/346 180/247
4,618,022 A * 10/1986 Hayashi .................. F16H 48/11 180/248
(Continued)

FOREIGN PATENT DOCUMENTS

DE 4041900 A * 7/1991
DE 3911118 C2 * 12/1998 ........... B60K 17/344
(Continued)

OTHER PUBLICATIONS

European Patent Office, International Search Report issued in International patent application No. PCT/EP2022/062576 (Aug. 12, 2022).
(Continued)

*Primary Examiner* — Justin Holmes
(74) *Attorney, Agent, or Firm* — Secant IP, PLLC

(57) ABSTRACT

The invention relates to a drive device (7) for a motor vehicle drive train of an electric vehicle. At least one electric machine (14) is provided as the drive machine on the output side of which a downstream transmission (18) is connected. In the transmission (18), an input side (17) and an output side (19) are axially offset (27) in relation to one another, where the output side (19) of the transmission (18) is connected to a distributor device (25) that is paired with
(Continued)

multiple outputs (9, 10), which in the motor vehicle drive train (2) each serve to connect one drive axle of the electric vehicle. In order to produce a drive device (7) that is suitable for an all-terrain electric vehicle, the output side (19) of the transmission (18) is positioned downwards in a vertical direction relative to the input side (17) of the transmission (18).

14 Claims, 6 Drawing Sheets

(51) Int. Cl.

| | |
|---|---|
| *B60K 17/348* | (2006.01) |
| *B60K 23/08* | (2006.01) |

(56) References Cited

U.S. PATENT DOCUMENTS

| | | | | | |
|---|---|---|---|---|---|
| 4,805,720 | A * | 2/1989 | Clenet | B60K 17/34 180/291 |
| 6,250,411 | B1 * | 6/2001 | Nesbitt | B60K 17/346 475/206 |
| 8,522,634 | B2 | 9/2013 | Bridges | |
| 11,225,238 | B2 | 1/2022 | Lauffer et al. | |
| 11,320,026 | B2 | 5/2022 | Li et al. | |
| 2005/0261101 | A1 * | 11/2005 | Yoshioka | B60K 17/16 475/231 |
| 2009/0264246 | A1 | 10/2009 | Carey et al. | |

FOREIGN PATENT DOCUMENTS

| | | | | |
|---|---|---|---|---|
| DE | 10 2016 006 208 | A1 | 11/2017 | |
| DE | 1 2016 217 920 | A1 | 3/2018 | |
| EP | 2 581 255 | A1 | 4/2013 | |
| EP | 3647097 | A1 * | 5/2020 | B60K 17/3467 |
| GB | 2414217 | A * | 11/2005 | B60K 28/16 |
| RU | 83043 | U1 * | 5/2009 | |
| WO | 2012/007030 | A1 | 1/2012 | |

OTHER PUBLICATIONS

European Patent Office, Written Opinion issued in International patent application No. PCT/EP2022/062576 (Aug. 12, 2022).

German Patent Office, Search Report issued in German patent application No. 10 2021 205 128.6 (Jan. 21, 2022).

* cited by examiner 32
24
25
44
31

39
43
32
42
24
41
25
31
40

30
32
38
33
36
24
35
34
37
25
31

DRIVE DEVICE FOR A MOTOR VEHICLE DRIVE TRAIN OF AN ELECTRIC VEHICLE

RELATED APPLICATIONS

This application claims the benefit under 35 U.S.C. § 371 as a U.S. National Phase Application of application no. PCT/EP2022/062576, filed on 10 May 2022, which claims benefit of German Patent Application no. 10 2021 205 128.6, filed 20 May 2021, the contents of which are hereby incorporated herein by reference in their entireties.

FIELD OF THE DISCLOSURE

The invention relates to a drive device for a motor vehicle drive train of an electric vehicle, comprising at least one electric machine as a drive machine, downstream of which a gear mechanism is arranged at the output side, wherein in the gear mechanism an input side and an output side are located with an axial offset relative to each other, and wherein the output side of the gear mechanism is connected to a distributor device with which at least two outputs which in the motor vehicle drive train are each used to connect a drive axle of the electric vehicle are associated. The invention further relates to a motor vehicle drive train having an above-mentioned device and an electric vehicle.

BACKGROUND

In electric vehicles, drive trains which are often composed of at least one electric machine and one or more gear mechanisms which are arranged downstream are known. Sometimes, it is possible to switch between different gears in this case in order to transmit a drive movement of the at least one electric machine with different transmission ratios. Part of such a drive device may in this instance also be a distributor device, via which a distribution of a drive movement which is brought about by means of the at least one electric machine and which is transmitted by means of the downstream gear mechanism(s) is carried out over a plurality of outputs.

DE 10 2016 006 208 A1 discloses a drive device for a motor vehicle drive train which is configured for an electric vehicle in the form of a utility vehicle. This drive device comprises in this instance one or more electric machines, downstream of which a gear mechanism is arranged. The drive device of DE 10 2016 006 208 A1 is in this instance configured for the arrangement between longitudinal carriers of a vehicle frame of the electric vehicle, wherein the gear mechanism in the installed state of the drive device is secured to a cross beam which extends between the longitudinal carriers. In a variant, the drive device is in this instance constructed to drive a plurality of drive axles of the electric vehicle, wherein the drive device is provided with two outputs for this purpose. The outputs are located in this instance so as to be offset in the transverse direction of the electric vehicle offset with respect to the electric machine(s) so that via the gear mechanism a transmission of a respective drive movement takes place with axial offset and distribution over both outputs.

SUMMARY

Based on the above-described prior art, an object of the present invention is to produce a drive device which is suitable for an all-terrain electric vehicle.

This object is achieved by a drive device as disclosed herein. The present disclosure also relates to a motor vehicle drive train which has a drive device according to the invention, and to an electric vehicle having a corresponding motor vehicle drive train.

According to the invention, a drive device comprises at least one electric machine as a drive machine, downstream of which a gear mechanism is arranged at the output side. In the gear mechanism, an input side and an output side are located with an axial offset relative to each other, wherein the output side of the gear mechanism is connected to a distributor device with which at least two outputs which in the motor vehicle drive train are each used to connect a drive axle of the electric vehicle are associated.

In the drive device according to the invention, there is provided at least one electric machine which in particular has a rotor and a stator. Preferably, the at least one electric machine may in this instance operate, on the one hand, in a generator mode in which it produces electric power by driving the respective rotor, wherein the at least one electric machine can be operated, on the other hand, in an electromotive mode in which by being supplied with electric current it produces itself a drive movement of the respective rotor. In the context of the invention, in this instance in particular precisely one electric machine is provided in the drive device, wherein the drive device according to the invention may, however, alternatively also have a plurality of electric machines.

Within the drive device according to the invention, there is arranged downstream of the at least one electric machine at the output side a gear mechanism which is provided with an input side and an output side. In this instance, the input side and the output side of the gear mechanisms are located with an axial offset with respect to each other, that is to say, the input side and the output side are placed at an axial spacing with respect to each other on axles which are preferably located parallel with each other. Preferably, the input side and the output side of the gear mechanism are permanently coupled to each other so that a drive movement which is introduced into the gear mechanism at the input side is also always transmitted to the output side of the gear mechanism.

At the input side of the gear mechanism, in this instance a connection to the at least one electric machine which is arranged upstream is produced, wherein this connection may in this instance be in the form of permanent connections so that a respective rotor of the at least one electric machine and the input side of the gear mechanism cannot rotate independently of each other. Alternatively, however, the connection between the input side of the gear mechanism and the at least one electric machine may also be able to be separated, whereby the at least one electric machine can be uncoupled from the input side of the gear mechanism.

The gear mechanism is connected at the output side thereof to a distributor device, wherein a plurality of outputs are associated with this distributor device. In this instance the distributor device is in the drive device according to the invention provided to distribute a drive power which is introduced into the distributor device via the output side of the gear mechanism permanently or only in the event of specific activation over the plurality of outputs, wherein, in the latter case, in particular at least one output is permanently coupled to the output side of the gear mechanism via the distributor device. The outputs of the drive device are in this instance configured, when the drive device is in a state installed in a motor vehicle drive train, to produce a connection to a respective drive axle of the electric vehicle. In this regard, the drive device according to the invention is configured for use in an electric vehicle with a permanent all-wheel drive or a switchable all-wheel drive.

The invention includes the technical teaching that the output side of the gear mechanism is located in a manner offset downward in a vertical direction with respect to the input side of the gear mechanism. In other words, the axial offset between the input side and the output side of the gear mechanism is selected in such a manner that the output side is positioned relative to the input side in a vertical direction and consequently vertically below the input side. A laterally inclined installation of the drive device is also possible.

Alternatively, the gear mechanism may also be installed in a rotated manner so that the input side is positioned relative to the output side in a vertical direction and consequently vertically below the output side.

Such a configuration of a drive device has the advantage that, as a result of the axial offset between the input shaft and output shaft in a vertical direction when the drive device is used in a motor vehicle drive train, drive-side component can be arranged in a higher position which results in a corresponding ground clearance in the electric vehicle. Consequently, a ground clearance which is required to produce an all-terrain electric vehicle can also be implemented as a result. At the same time, via the drive device, a central drive of a plurality of drive axles can be carried out so that an electric vehicle with a permanent all-wheel drive or switchable all-wheel drive can be produced.

In contrast, in the drive device of DE 10 2016 006 208 A1 an axial offset in a transverse direction is carried out, which, when the drive device is used in a motor vehicle drive train, results in no increase in the ground clearance.

According to one embodiment of the invention, there is provided between the at least one electric machine and the gear mechanism a multi-speed gear mechanism via which different transmission ratios can be switched between a respective output side of the at least one electric machine and the input side of the gear mechanism. Advantageously, it is thereby possible to transmit a drive movement of the at least one electric machine with different transmission ratios to the input side of the gear mechanism, whereby using the at least one electric machine a greater travel range can be covered. The multi-speed gear mechanism may in this instance in order to constitute the different transmission ratios have planetary gear sets and/or spur gear stages, wherein the different transmission ratios are preferably switched by means of selective activation of associated switching elements. These switching elements may in this instance in the context of the invention be in the form of positive-locking switching elements, for example, as unsynchronized claw switching elements, or blocking synchronization, or also be in the form of non-positive-locking switching elements, for example, in the form of a multi-disk switching element. An asynchronization via the engine control unit during the switching operation is also possible.

If a plurality of electric machines are provided in the drive device according to the invention, there is preferably provided between the gear mechanism and the electric machines a multi-speed gear mechanism via which the electric machines can be coupled individually or also together to the downstream gear mechanism with the different transmission ratios being constituted. In this instance, the multi-speed gear mechanism has a plurality of input shafts which are each associated with one of the electric machines. A connection to the downstream gear mechanism is then preferably produced on an individual output shaft of the multi-speed gear mechanism. Alternatively, however, each electric machine may also be associated with a multi-speed gear mechanism, whereby the downstream gear mechanism is then intended to be provided at the input side thereof in particular with a plurality of drive shafts, to which the respective electric machine is connected with the associated, interposed multi-speed gear mechanism.

In a further development of the above-mentioned embodiment, the at least one electric machine and the multi-speed gear mechanism are combined to form a drive unit. In the region of the drive device, a compact structure can thereby be achieved by the electric machine and the associated multi-speed gear mechanism forming one drive unit. In this instance, the electric machine and the multi-speed gear mechanism can be received in a common housing. Alternatively, it is also conceivable for the electric machine to be secured directly with the housing thereof to a housing of the multi-speed gear mechanism. The drive unit having a multi-speed gear mechanism may also be in such a form that the electric machine elements are configured to be so great that the multi-speed gear mechanism elements are located inside the electric machines. In this instance, an assembly complexity for the drive device according to the invention can also be reduced since the drive unit which is formed by the electric machine and multi-speed gear mechanism may already be present as a pre-assembled unit.

Alternatively, or additionally to the above embodiment, the at least one electric machine and the gear mechanism are combined to form one module. This has the advantage that consequently on the whole a compact construction type of the drive device according to the invention can be produced. If a multi-speed gear mechanism is additionally provided between the at least one electric machine and the gear mechanism, this multi-speed gear mechanism is also preferably part of the module and is in this instance positioned between the electric machine and gear mechanism. With regard to the possibilities of the construction, of the arrangement and the integration of a multi-speed gear mechanism, in this instance one of the variants already described above can be implemented.

According to an alternative possible embodiment, the at least one electric machine and the gear mechanism are in the form of separate units, wherein a connection between these units is produced by means of a joint shaft. It is thereby possible for the electric machine and the gear mechanism also to be arranged within the drive device with a spacing relative to each other, wherein a supply of a drive power of the at least one electric machine to the gear mechanism or also an introduction of a drive movement from the gear mechanism into the at least one electric machine in the generator mode thereof is completed via the intermediate joint shaft. The coupling to the gear mechanism may in this instance also be implemented in the embodiment, in which a multi-speed gear mechanism is provided between the at least one electric machine and the gear mechanism. In this instance, this multi-speed gear mechanism may be combined with the electric machine to form a drive unit, wherein the joint shaft then connects an output side of the multi-speed gear mechanism to the input side of the gear mechanism. Alternatively, however, the multi-speed gear mechanism may also be placed at the side of the gear mechanism, wherein, in this instance, the joint shaft then connects an output side of the at least one electric machine to a drive side of the multi-speed gear mechanism.

In a further development of the invention, the input side and the output side of the gear mechanism are coupled to each other by means of at least one spur gear stage. It is thereby advantageously possible, on the one hand, for a permanent coupling of the input side and output side of the gear mechanism to be implemented and, on the other hand, for the axial offset between the input side and output side to be constituted.

According to another embodiment of the invention, the distributor device comprises a differential gear mechanism, which is in particular in the form of a bevel gear differential or a planetary differential. In this instance, via the differential gear mechanism a drive power can be distributed over output shafts, which are each connected to one of the outputs. The use of a differential gear mechanism has the advantage that a permanent distribution of a drive torque over the outputs and consequently, in the installed state of the distributor gear mechanism, over the respective drive axles, is carried out with the possible compensation of speed differences. The distributor gear mechanism is thereby also configured for a motor vehicle with a permanent all-wheel drive. In this instance, in the case of an embodiment as a bevel gear differential, a uniform torque distribution is produced, whilst, in the case of an embodiment of the differential gear as a planetary differential, a non-uniform distribution is also possible.

In the context of the invention, a blocking device may further be associated with the differential gear mechanism, via which blocking device a rigid connection is brought about between the output shafts during activation and consequently a compensation effect of the differential gear mechanism is cancelled. In a particularly preferred manner, this blocking device is in this instance automatically activated, wherein there are more preferably associated with the blocking device sensors which detect speeds at the outputs. Based on the detected speeds, the blocking device may, when at least one criterion is present, carry out an automatic blocking of the differential gear mechanism.

Alternatively, to the above-mentioned embodiment, an input side of the distributor device is permanently coupled to a first output, whereas a second output can be connected to the first output by means of a coupling. In this variant, therefore, only the first output is permanently coupled to the input side of the distributor device and consequently also to the upstream gear mechanism, whilst the second output in an opening state of the coupling is uncoupled from the input side of the distributor device and also the first output. However, if the coupling is then moved into an activated state, the outputs are rigidly connected to each other and accordingly rotate at the same speed. In this instance, a drive torque which is introduced at the input side of the distributor device is divided over both outputs in a uniform manner and at the same speed. The distributor gear mechanism according to the invention is thereby provided with a switchable all-wheel drive for a motor vehicle drive train of an electric vehicle.

In the variant described above, sensors may be provided on the outputs in order to detect a respective speed of the individual output. More preferably, there is then provided an activation device via which the coupling can be automatically activated when, as a result of the speeds detected, a respective criterion is identified as being fulfilled. Ultimately, therefore, an automatic switching of a drive axle is thereby implemented when specific conditions are detected.

The invention further relates to a motor vehicle drive train for an electric vehicle, which has a drive device according to one or more of the above-mentioned variants. Advantageously, a drive train for an electric vehicle with an all-wheel drive or switchable all-wheel drive can thereby be implemented, wherein sufficient ground clearance for an all-terrain electric vehicle is achieved in this case.

In a further development of a motor vehicle drive train according to the invention, in this instance at least one drivable front axle is drivingly connected to an output of the drive device and at least one drivable rear axle is drivingly connected to another output of the drive device. In a particularly preferred manner, in the drive train precisely one drivable front axle and precisely one drivable rear axle are provided, wherein the front axle and the rear axle are each connected to the associated output of the drive device according to the invention. In a particularly preferred manner, a driving connection between an output of the drive device and a drive axle is produced by means of an intermediate joint shaft.

The invention additionally relates to an electric vehicle which in a particularly preferred manner is a utility vehicle. In this instance, this electric vehicle is provided with a drive train according to one or more of the above-mentioned possible embodiments. The electric vehicle is in this instance in particular in the form of an all-terrain vehicle.

The invention is not limited to the combination of the features of the main claim as set out or the dependent claims. There are further possible ways of combining individual features with each other as long as they are derived from the claims, the following description of preferred embodiments of the invention or directly from the drawings. The reference of the claims to the drawings with the use of reference numerals is not intended to limit the protective scope of the claims.

BRIEF DESCRIPTION OF THE DRAWINGS

Advantageous embodiments of the invention which are explained below are illustrated in the drawings, in which.

DETAILED DESCRIPTION

Figure 1:
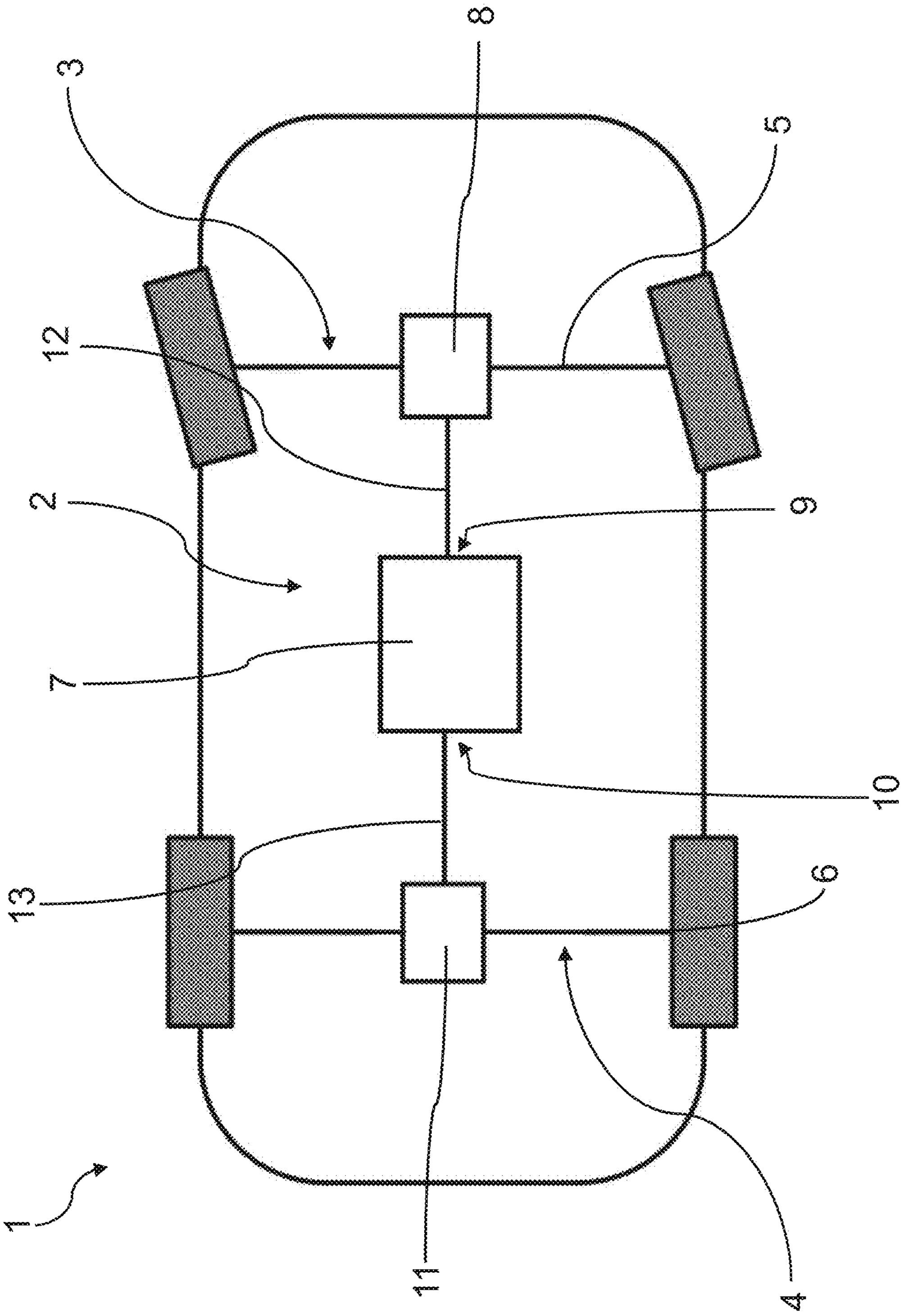
FIG. 1 shows a schematic illustration of an electric vehicle according to a preferred embodiment of the invention.

FIG. 1 shows a schematic view of an electric vehicle 1 which is in particular an all-terrain utility vehicle. The electric vehicle 1 has in this instance a motor vehicle drive train 2 which is provided with two drive axles 3 and 4. The drive axle 3 in this instance is a steerable front axle 5 and the drive axle 4 is a non-steerable rear axle 6. In this regard the electric vehicle 1 is provided with a permanent or switchable all-wheel drive.

Within the drive train 2, the two drive axles 3 and 4 can be driven by means of a drive device 7 which is placed in the longitudinal direction of the electric vehicle 1 between the drive axles 3 and 4. Specifically, in this instance an axle differential 8 of the drive axle 3 is connected to an output 9 of the drive device 7, wherein the drive device 7 is additionally connected to an output 10 by means of an axle differential 11 of the drive axle 4. A connection of the output 9 or 10 to the axle differential 8 or 11 of the drive axle 3 or 4 is in this instance produced by means of an intermediate joint shaft 12 or 13, respectively.

Figure 2:
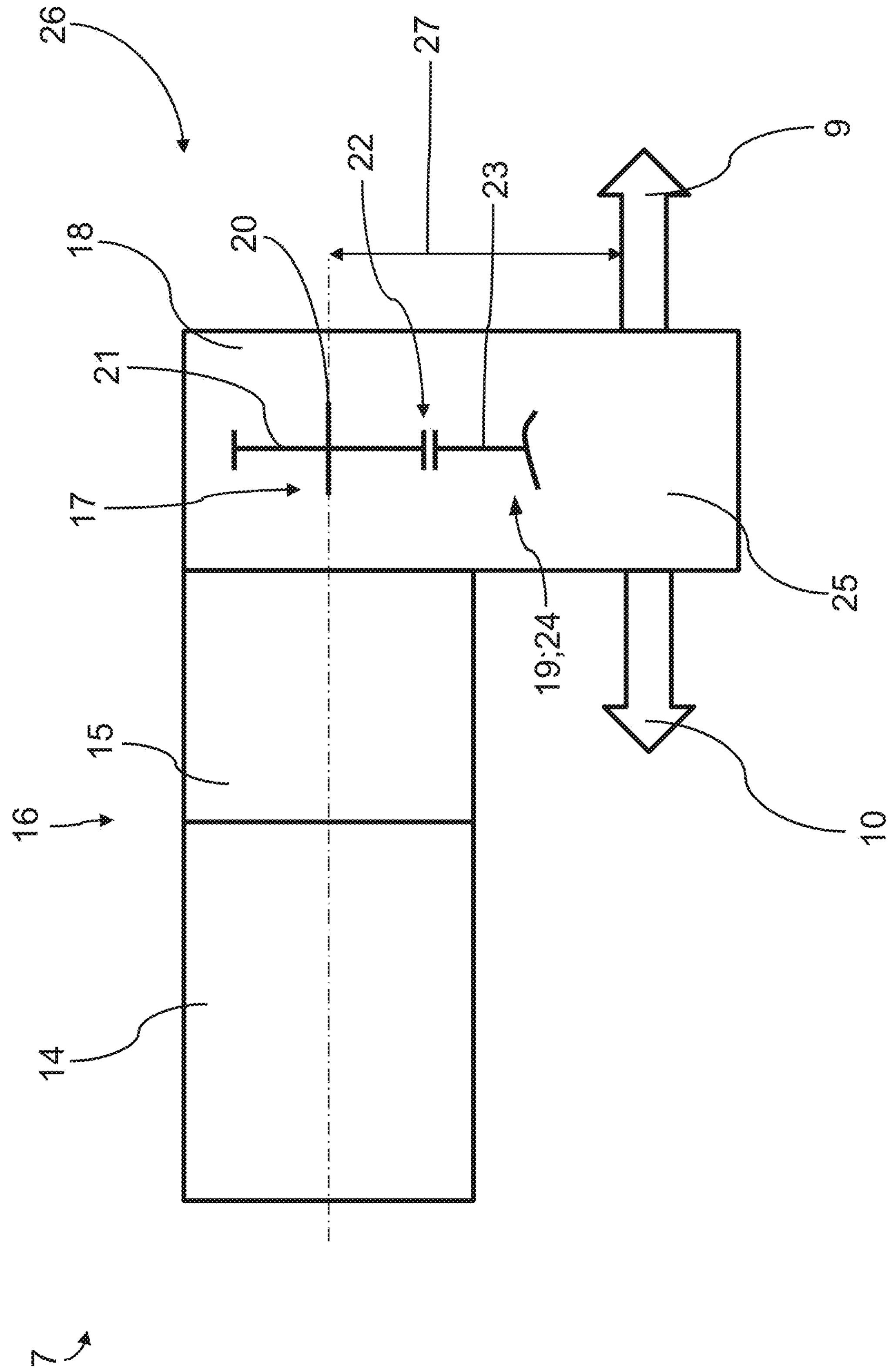
FIG. 2 shows a schematic view of a drive device according to a first embodiment of the invention.

FIG. 2 shows a schematic single view of the drive device 7, wherein this drive device 7 is constructed in this instance according to a first embodiment of the invention. This drive device 7 comprises an electric machine 14 which—in this instance, not shown in greater detail—is composed of a stator and a rotor. The electric machine 14 may in this instance be operated, on the one hand, as a generator and, on the other hand, as an electric motor.

Figure 3:
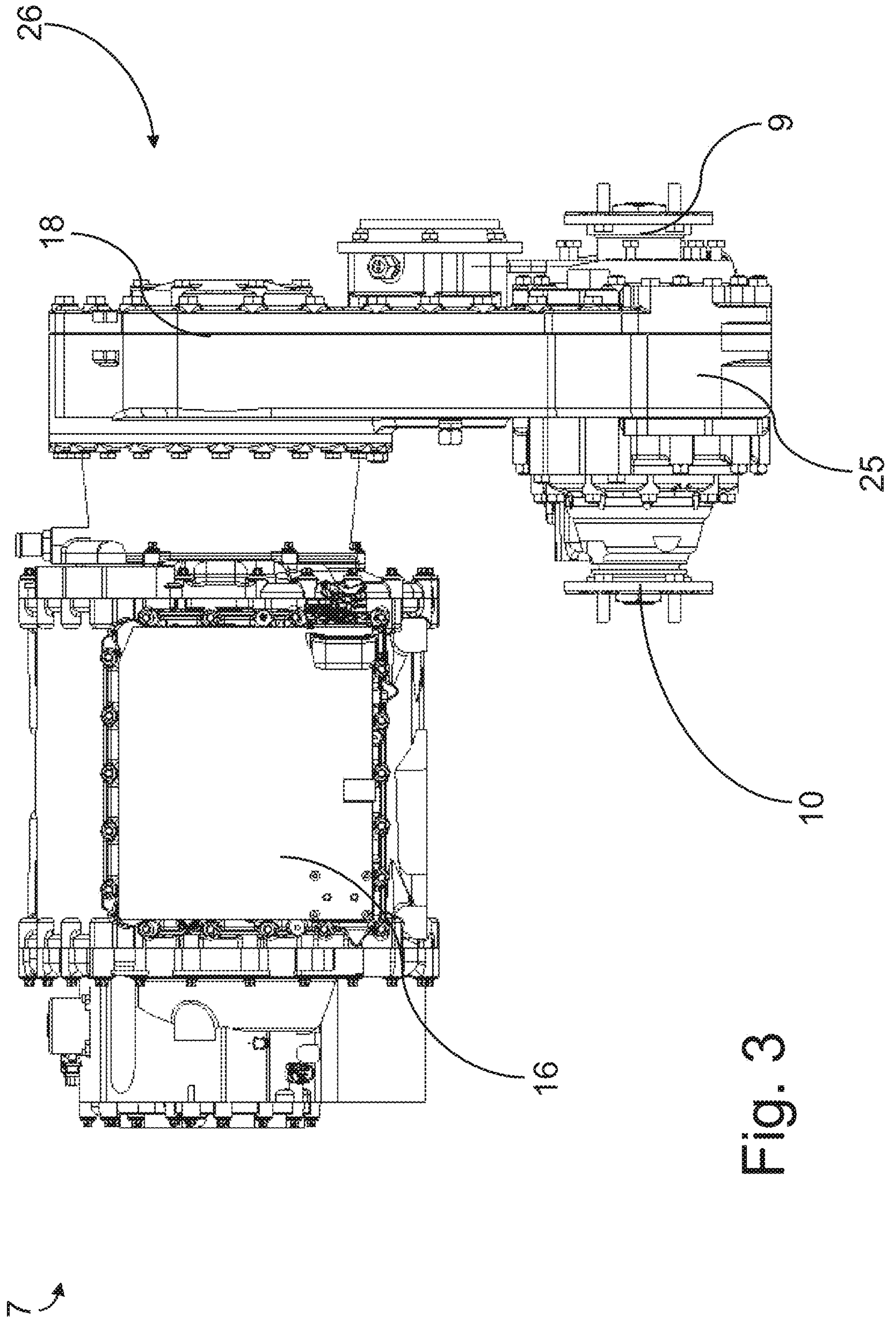
FIG. 3 shows a side view of the drive device from FIG. 2.

The rotor of the electric machine 14 is preferably connected by means of a rotor shaft to a drive side of a downstream multi-speed gear mechanism 15, wherein the multi-speed gear mechanism 15 in this instance, as can be seen in FIG. 3, is combined with the electric machine 14 to form a drive unit 16. In the multi-speed gear mechanism 15, different transmission ratios can be switched between the drive side and an output side of the multi-speed gear mechanism 15, wherein the multi-speed gear mechanism 15 in order to constitute these different transmission ratios is provided with planetary wheel sets and/or spur gear stages. Preferably, the transmission ratios may in this instance be switched by means of selective activation of switching elements, which may be in detail in the form of non-positive-locking switching elements or positive-locking switching elements.

The output side of the multi-speed gear mechanism 15 is connected to an input side 17 of a downstream gear mechanism 18 in which a drive movement which is introduced at the input side is permanently transmitted to an output side 19 of the gear mechanism 18. The input side 17 of the gear mechanism 18 is in this instance formed by a shaft 20 on which a spur gear 21 of a spur gear stage 22 is arranged in a rotationally secure manner. This spur gear 21 is in this instance in toothed engagement with a spur gear 23 of the spur gear stage 22, wherein the spur gear 23, on the one hand, forms the output side 19 of the gear mechanism 18 and, on the other hand, also an input side 24 of a distributor device 25 which follows the gear mechanism 18. The distributor device 25 is in this instance combined with the gear mechanism 18 and the drive unit 16 comprising the electric machine 14 and multi-stage gear mechanism 15 to form a module 26 by the distributor device 25 and the gear mechanism 18 being combined in a housing on which the drive unit 16 is also directly arranged. The housing can also be seen in particular in FIG. 3.

With the all-terrain electric vehicle 1 from FIG. 1, in order to produce the largest possible ground clearance, the input side 17 and the output side 19 of the gear mechanism 18 are located in a vertical direction with an axial offset 27 with respect to each other, whereby the drive unit 16 is also arranged in a higher position with respect to the outputs 9 and 10.

Figure 4:
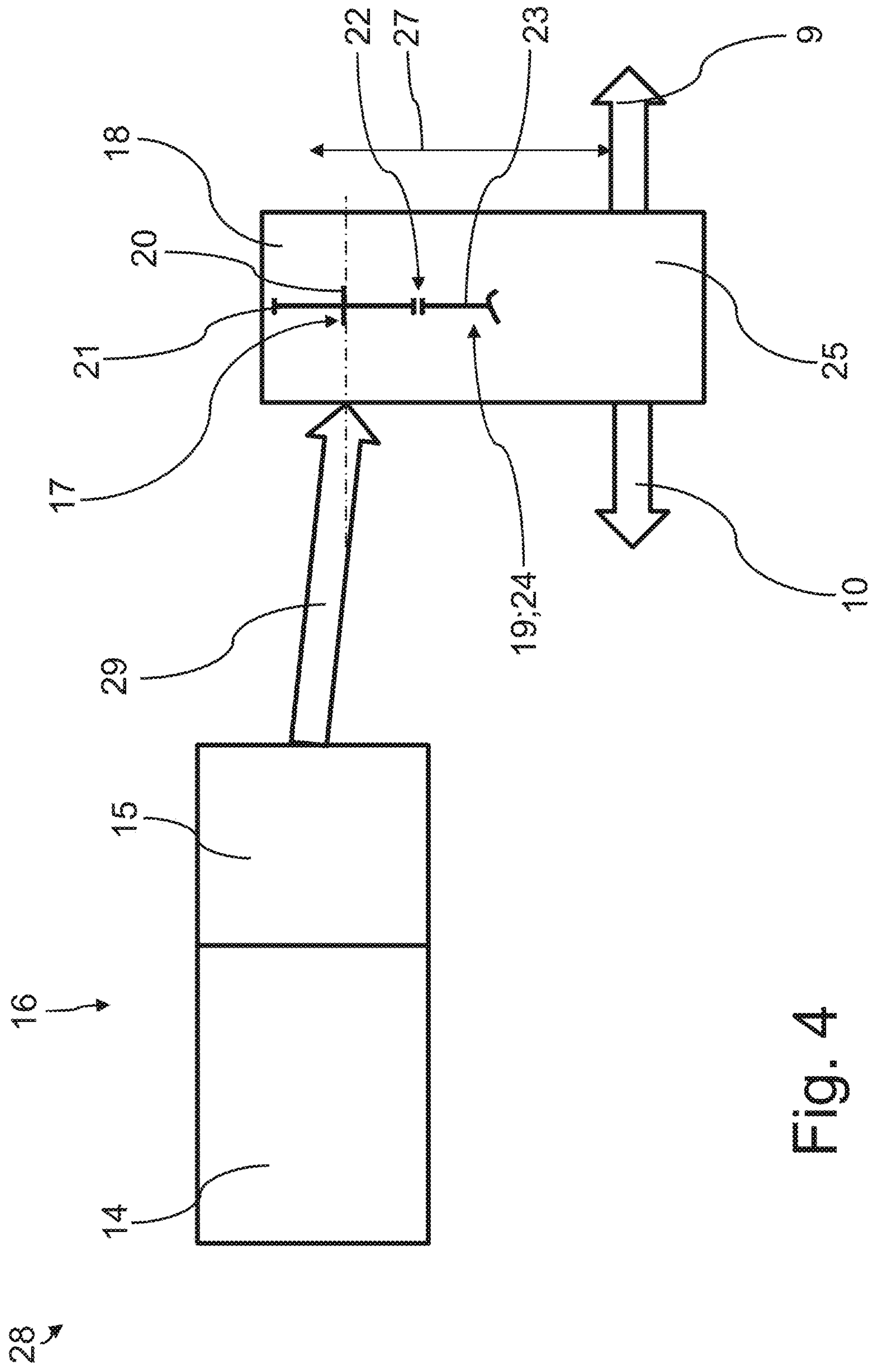
FIG. 4 shows a schematic illustration of a drive device according to a second embodiment of the invention.
Figure 5:
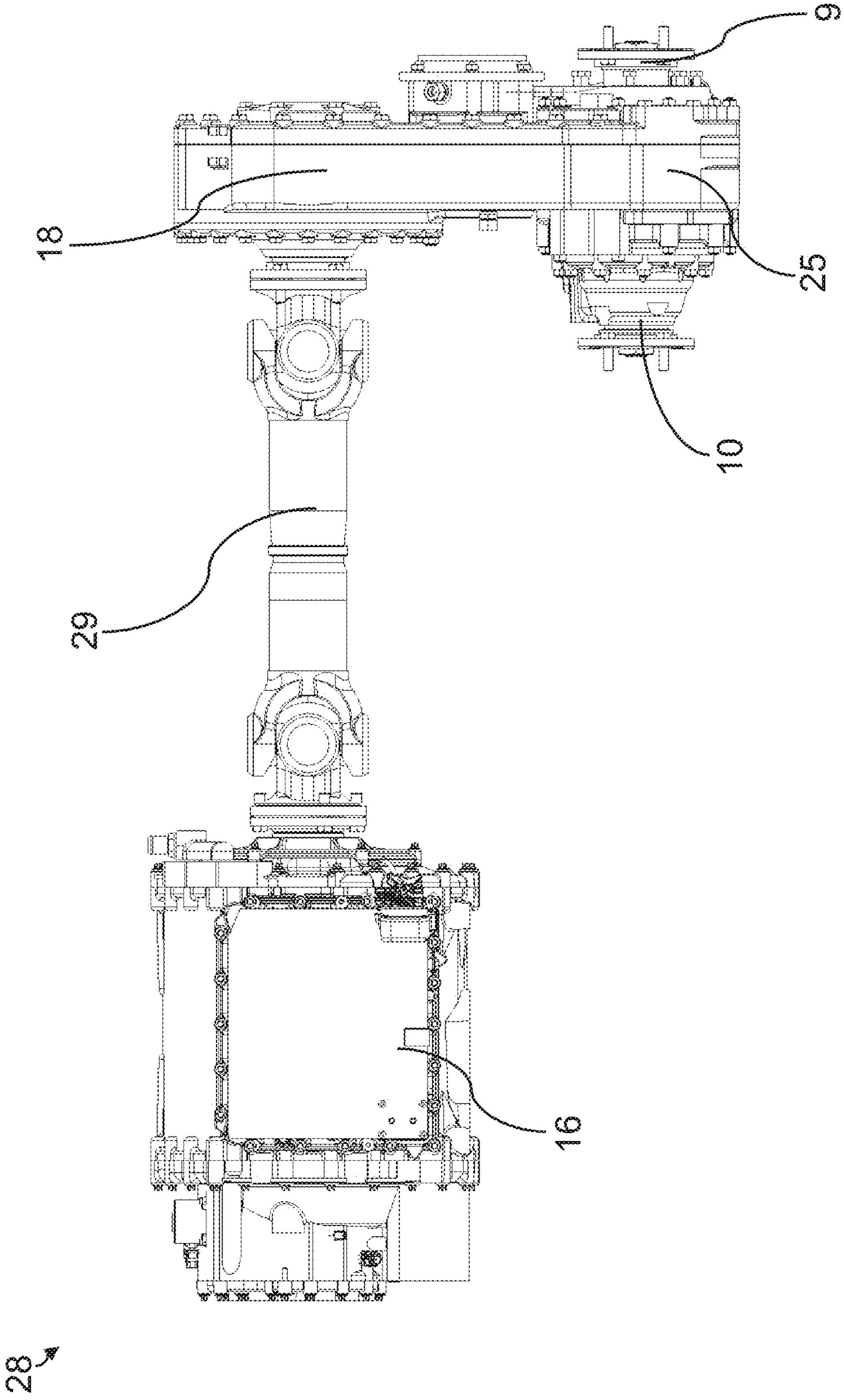
FIG. 5 shows a side view of the drive device from FIG. 4.

FIGS. 4 and 5 further show views of a drive device 28, which is constructed in accordance with a second embodiment of the invention, and which can also be used in the motor vehicle drive train 2 in FIG. 1. In this instance, this drive device 28 substantially corresponds to the drive device 7 according to FIGS. 2 and 3 with the difference that the drive unit 16 which is formed from the electric machine 14 and multi-speed gear mechanism 15 is arranged as a separate unit from the gear mechanism 18 and the distributor device 25. A connection between the drive unit 16 and the input side 17 of the gear mechanism 18 is in this instance produced by means of a joint shaft 29. Consequently, the drive unit 16 may also be positioned in a manner offset further upward in a vertical direction with respect to the input side 17. Otherwise, the embodiment according to FIGS. 4 and 5 corresponds to the variant according to FIGS. 2 and 3 so that reference may be made to what has been described in this regard.

Figure 8:
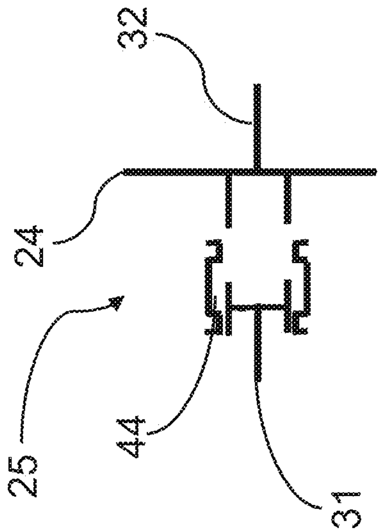
FIGS. 6 to 8 show schematic views of possible embodiments of a distributor device of the drive devices from FIGS. 2 and 3 or FIGS. 4 and 5.
Figure 7:
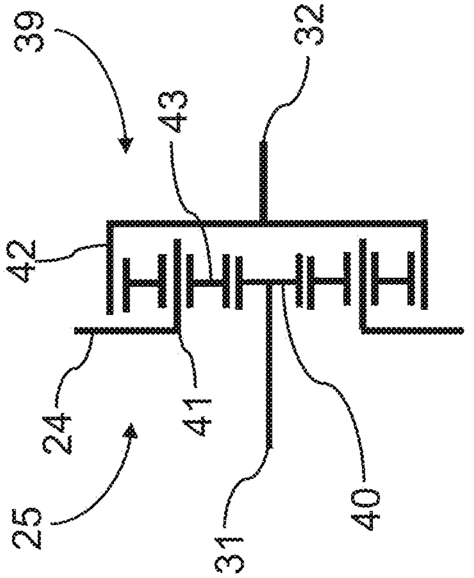
Figure 6:
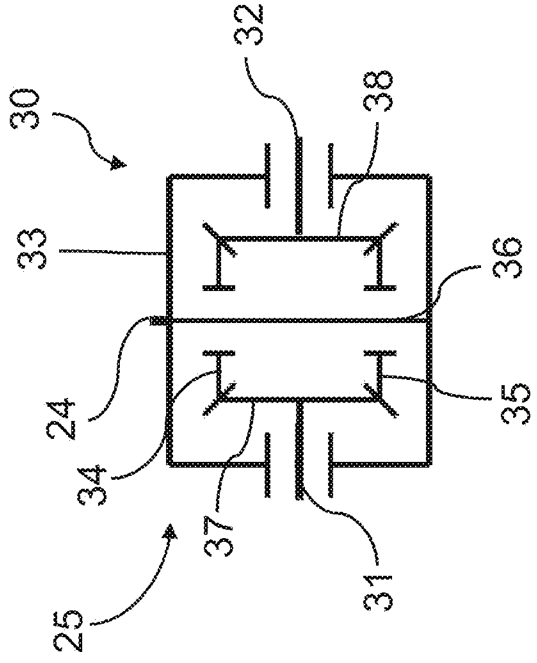

FIGS. 6 to 8 show possible embodiments of the distributor device 25, as can be implemented in each case in the drive devices 7 and 28 from FIGS. 2 and 3 or FIGS. 4 and 5. In this instance, FIG. 6 shows an embodiment of the distributor device 25, in which the distributor device 25 has a bevel gear differential 30 via which a drive power which is introduced at the input side 24 of the distributor device 25 is distributed over output shafts 31 and 32 which each form the outputs 9 and 10. In this instance, the input side 24 in the form of the spur gear 23 is connected in a rotationally secure manner to a differential basket 33 of the bevel gear differential 30.

In the differential basket 33, two compensation bevel gears 34 and 35 are rotatably supported on a pin 36, wherein the compensation bevel gears 34 and 35 in each case mesh with output bevel gears 37 and 38 which are each placed in a rotationally secure manner on one of the output shafts 31 and 32. Via the bevel gear differential 30, a uniform torque distribution over the two outputs 9 and 10 is carried out with the possible compensation of speed differences.

In contrast, FIG. 7 shows a variant of the distributor device 25 in which the distributor device 25 has a planetary differential 39. The planetary differential 39 is composed of a sun gear 40, a planetary web 41 and a ring gear 42, wherein there are rotatably supported in the planetary web 41 a plurality of planetary wheels 43 which are each in toothed engagement both with the sun gear 40 and with the ring gear 42.

The planetary web 41 is in this instance connected in a rotationally secure manner to the input side 24 in the form of the spur gear 23. Whilst the sun gear 40 is connected to the output shaft 31 in a rotationally secure manner, the ring gear 42 is connected to the output shaft 32 in a rotationally secure manner. Also, in the planetary differential 39 there is a torque distribution over the outputs 9 and 10 with possible compensation of speed differences, but with, in contrast to the spur gear differential 30, in this instance a non-uniform torque distribution being possible.

In the embodiment of the distributor device 25 as shown in FIG. 8, the output shaft 32 is permanently connected to the input side 24 of the distributor device 25. In contrast, the output shaft 31 can be connected to the output shaft 32 and consequently also to the input side 24 by means of an intermediate coupling 44, whereby a drive power which is introduced at the input side 24 is distributed in a uniform manner over both output shafts 31 and 32. A compensation of speed differences does not take place in this instance. In contrast to the two previous variants according to FIG. 6 or 7, in the embodiment of the distributor device 25 according to FIG. 8 no permanent drive all-wheel drive is produced since, in an open state of the coupling 44, no force path to the output shaft 31 and consequently to the output 10 takes place. In the embodiment according to FIG. 6, the all-wheel drive can be switched on by activating the coupling 44.

By means of the configurations of a drive device according to the invention, a compact drive of an all-terrain electric vehicle with high ground clearance can be implemented.

LIST OF REFERENCE NUMERALS

1 Electric vehicle
2 Motor vehicle drive train
3 Drive axle
4 Drive axle

5 Front axle
6 Rear axle
7 Drive device
8 Axle differential
9 Output
10 Output
11 Axle differential
12 Joint shaft
13 Joint shaft
14 Electric machine
15 Multi-speed gear mechanism
16 Drive unit
17 Input side
18 Gear mechanism
19 Output side
20 Shaft
21 Spur gear
22 Spur gear stage
23 Spur gear
24 Input side
25 Distributor device
26 Module
27 Axial offset
28 Drive device
29 Joint shaft
30 Bevel gear differential
31 Output shaft
32 Output shaft
33 Differential basket
34 Compensation bevel gear
35 Compensation bevel gear
36 Pin
37 Output bevel gear
38 Output bevel gear
39 Planetary differential
40 Sun gear
41 Planetary web
42 Ring gear
43 Planetary gears
44 Coupling

The invention claimed is:

1. A drive device for a motor vehicle drive train of an electric vehicle, the drive device comprising:

a distributor device comprising a differential gear mechanism having a plurality of outputs each configured to connect to a drive axle of an electric vehicle, wherein via the differential gear mechanism a drive power can be divided over output shafts each of which is connected to one of the plurality of outputs;

at least one electric machine configured as a drive machine;

a gear mechanism arranged downstream of the at least one electric machine and positioned at an output side thereof; and a blocking device associated with the differential gear mechanism;

wherein the gear mechanism has an input side and an output side, the output side of the gear mechanism having a vertically downward axial offset relative to the input side of the gear mechanism, and wherein the output side of the gear mechanism is connected to the distributor device.

2. The drive device as claimed in claim 1, comprising a multi-speed gear mechanism between the at least one electric machine and the gear mechanism, wherein the multi-speed gear mechanism is configured for switching between different transmission ratios between a respective output side of the at least one electric machine and the input side of the gear mechanism.

3. The drive device as claimed in claim 2, wherein the at least one electric machine and the multi-speed gear mechanism are combined to form a drive unit.

4. The drive device as claimed in claim 1, wherein the at least one electric machine and the gear mechanism are combined to form one module.

5. The drive device as claimed in claim 1, wherein the at least one electric machine and the gear mechanism are in the form of separate units connected via a joint shaft.

6. The drive device as claimed in claim 1, wherein the input side and the output side of the gear mechanism are coupled to each other via at least one spur gear stage.

7. The drive device as claimed in claim 1, wherein an input side of the distributor device is permanently coupled to a first output, and wherein a second output is configured to be connected to the first output via a coupling.

8. The drive device of claim 1, wherein the differential gear mechanism is configured as a bevel gear differential.

9. The drive device of claim 1, wherein the differential gear mechanism is configured as a planetary differential.

10. The drive device according to claim 1, further comprising at least one sensor associated with the blocking device, wherein the blocking device is configured to automatically activate based on a speed detected by the at least one sensor.

11. A motor vehicle drive train for an electric vehicle, the motor vehicle drive train comprising the drive device of claim 1.

12. The motor vehicle drive train as claimed in claim 11, comprising:

at least one drivable front axle drivingly connected to an output of the drive device; and at least one drivable rear axle drivingly connected to another output of the drive device.

13. An electric vehicle, comprising the motor vehicle drive train of claim 12.

14. The electric vehicle of claim 13, wherein the electric vehicle is configured as a utility vehicle.

* * * * *